United States Patent [19]
Hamner et al.

[11] Patent Number: 5,960,439
[45] Date of Patent: Sep. 28, 1999

[54] DEFINING A SCHEMA FOR A DATABASE REPRESENTING A MODEL OF A COMPUTER NETWORK

[75] Inventors: John F. Hamner, Pleasant Grove; Sandra Janich, Salt Lake City; Brian D. Sevy, Lehi, all of Utah; Dzung D. Tran, Beaverton; Frank K. Welch, Portland, both of Oreg.

[73] Assignee: Intel Corporation, Santa Clara, Calif.

[21] Appl. No.: 09/016,810

[22] Filed: Jan. 30, 1998

Related U.S. Application Data

[62] Division of application No. 08/577,875, Dec. 22, 1995, Pat. No. 5,796,951.

[51] Int. Cl.$^6$ ....................................... G06F 17/30
[52] U.S. Cl. .................. 707/103; 707/102; 707/104; 395/200.09; 395/200.32; 395/200.53; 395/200.54; 364/491; 706/45
[58] Field of Search ............................. 707/10, 103, 104, 707/102; 395/200.09, 200.32, 200.53, 200.54; 364/491; 706/45

[56] References Cited

U.S. PATENT DOCUMENTS

| | | | |
|---|---|---|---|
| 4,823,283 | 4/1989 | Diehm et al. | 345/352 |
| 4,864,492 | 9/1989 | Blakely-Fogel et al. | 706/45 |
| 5,261,044 | 11/1993 | Dev et al. | 345/357 |
| 5,335,323 | 8/1994 | Kolnick | 345/340 |
| 5,335,346 | 8/1994 | Fabbio | 711/163 |
| 5,394,522 | 2/1995 | Sanchez-Frank et al. | 345/349 |
| 5,398,336 | 3/1995 | Tantry et al. | 707/103 |
| 5,414,812 | 5/1995 | Filip et al. | 707/103 |
| 5,428,730 | 6/1995 | Baker et al. | 345/335 |
| 5,434,791 | 7/1995 | Koko et al. | 364/468.03 |
| 5,452,415 | 9/1995 | Hotka | 345/329 |
| 5,471,399 | 11/1995 | Tanaka et al. | 364/491 |
| 5,471,596 | 11/1995 | Brown, III | 707/103 |
| 5,483,631 | 1/1996 | Nagai et al. | 345/329 |
| 5,504,921 | 4/1996 | Dev et al. | 345/200.53 |
| 5,553,226 | 9/1996 | Kiuchi et al. | 345/356 |
| 5,604,892 | 2/1997 | Nuttall et al. | 395/500 |
| 5,611,050 | 3/1997 | Theimer et al. | 395/200.32 |
| 5,613,099 | 3/1997 | Erickson et al. | 395/500 |
| 5,796,951 | 8/1998 | Hamner et al. | 395/200.53 |

OTHER PUBLICATIONS

Anonymous, "User Interface Design to Hide Complexity in Dialogs," *IBM Technical Disclosure Bulletin*, vol. 34, No. 9, Feb. 1992, pp. 234–236.

*Primary Examiner*—Paul R. Lintz
*Attorney, Agent, or Firm*—Blakely, Sokoloff, Taylor & Zafman LLP

[57] ABSTRACT

A computer-implemented method of managing a computer network including a plurality of devices is provided, wherein a plurality of network management tasks are performable upon the devices. Data is gathered about a present configuration of the network, including the types of devices in the network, the quantity of each type of device present in the network, the relationships between the devices, and the tasks performable upon each of the devices. The data is then stored in a database representing a network map. A display is generated corresponding to the network map using the data in the database. The display shows an association of the devices with the tasks performable on the devices using bitmap representations of the devices and tasks. The display may include hierarchical, schematic, or geographical representations of the devices on the network. The devices are organized into a plurality of groups. In response to a user input selecting a device or group, the tasks performable by that device or group are identified on the display. A user may initiate any one of the displayed tasks by applying a user input selecting that task.

4 Claims, 15 Drawing Sheets

5,960,439

DEFINING A SCHEMA FOR A DATABASE REPRESENTING A MODEL OF A COMPUTER NETWORK

The present application is a divisional of U.S. application Ser. No. 08/577,875, filed on Dec. 22, 1995 now U.S. Pat. No. 5,796,951.

FIELD OF THE INVENTION

The present invention pertains to the field of computer networking. More particularly, the present invention relates to tools for providing management services for a computer network.

BACKGROUND OF THE INVENTION

The rapidly increasing use of personal computers has created a growing interest worldwide in computer networking, a prime example of which is the pervasive use of "the Internet". Computer networking on a smaller scale, such as in the form of Local Area Networks (LANs), has also expanded into countless different areas of business and technology. As users place more reliance upon computer networks, however, they also demand more sophisticated capabilities for managing these networks. Various different software packages exist for providing users with such capabilities.

Existing software products for network management have several disadvantages, however. For example, such products tend to be largely "tool-based". That is, although the software provides the user (e.g., a network administrator) with a set of tools for performing network functions, such as troubleshooting, it is often up to the user to determine which tool is best for performing a particular task and to determine on which devices in the network a task should be performed. Further, it is often difficult for a network administrator or user to become proficient enough with the available management tools to be able to use those tools to their full potential. These tools also tend to require that the user have extensive knowledge about the layout of the network, and that the user provide this information to the management tool. Moreover, existing network management tools generally provide the user with only one or two predetermined formats for examining the layout of the network.

Hence, what is needed is a set of network management services which are designed from a more flexible, device-oriented perspective. Specifically, what is needed is a network management tool which provides the user with information on the layout of the network, tasks that can be performed, and the devices on which each particular task can be performed. What is further needed is a tool which provides the user with customizable ways of viewing the layout of the network.

SUMMARY OF THE INVENTION

A computer-implemented method of providing information on a computer network is provided. The network includes a number of devices. A number of tasks are provided, such that each task can be performed upon at least one of the devices. In the method, a display is generated having a first area corresponding to the devices and a second area corresponding to the tasks. A representation of a subset of the plurality of devices is displayed in the first area. A user input selecting the representation is accepted, and, in response to the user input, information indicating which of the tasks can be performed upon each device of the subset is displayed in the second area.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for providing management services for a computer network is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

The present invention includes steps for providing a number of core services for managing a computer network, such as a local area network (LAN). The steps may be performed by a general purpose processor programmed with instructions that cause the processor to perform the recited steps. The instructions may be stored in a memory or on a magnetic disk, CD-ROM, or any other mass storage device.

Alternatively, the steps may be performed by specific hardware components that contain hard-wired logic for performing the recited steps, or by any combination of programmed general purpose computer components and custom hardware components.

Figure 3:
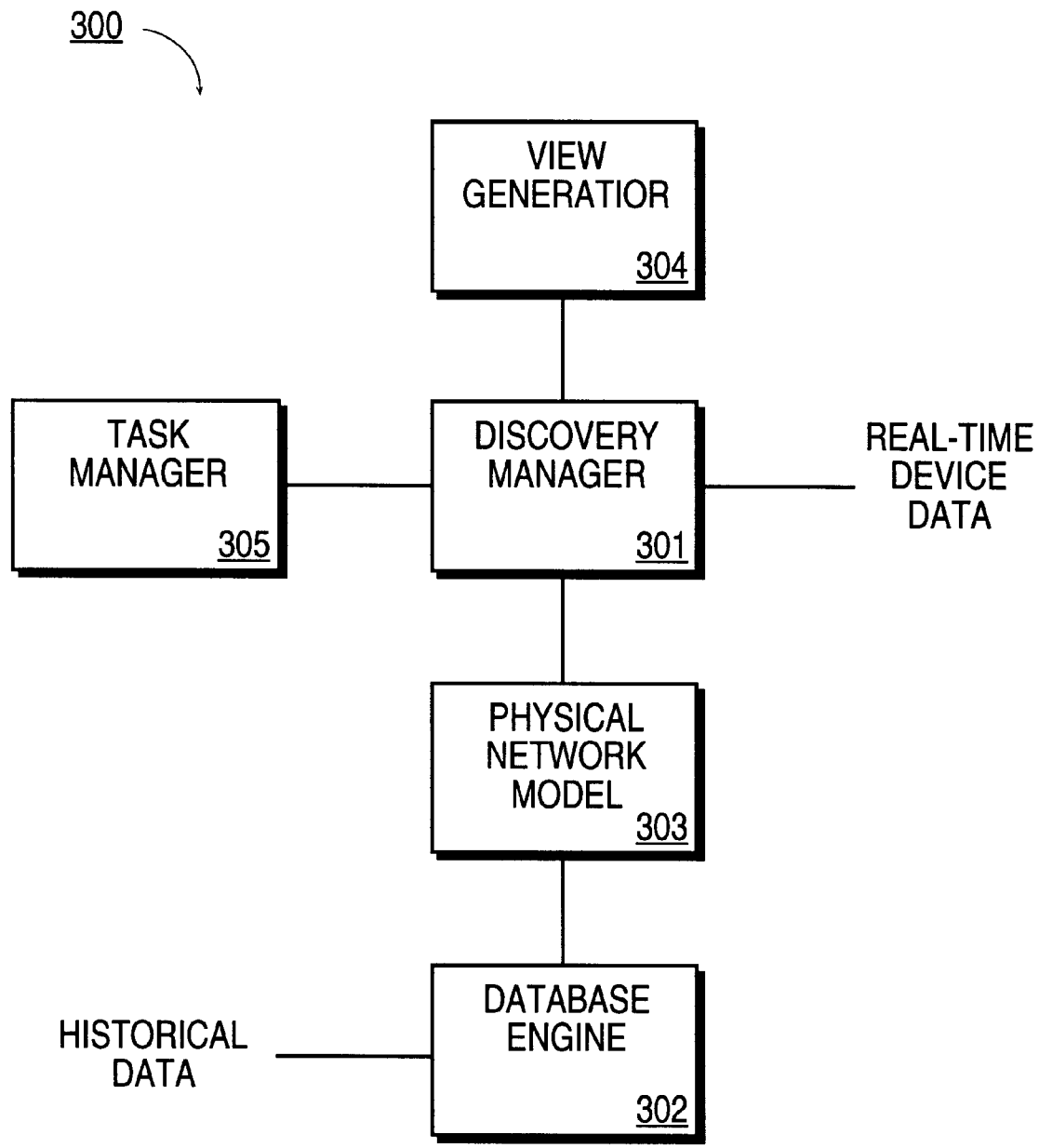
FIG. 3 is a block diagram of core services for managing a network.

As illustrated in FIG. 3, the core services 300 include a discovery manager 301, a database engine 302, a physical network model 303, a view generator 304, and a task manager 305. The core services 300 provide a user, such as a LAN administrator, with customizable views of the layout of a network, the various network management tasks that can be performed on devices in the network, and the particular devices on which each task can be performed. It should be noted that, for purposes of this description, the term "device" may refer to either a physical device or a logical device.

The functions and information provided by the core services 300 are presented through a graphical user interface. Accordingly, the present invention is designed to operate in a windows-and-icons environment. Specific methods for implementing a windows-and-icons environment are well known in the computer art and therefore will not be described herein. The present invention also operates in conjunction with an operating system and system functions capable of displaying windows, graphical and textural information within windows, and cursor symbols on the display device. System functions for interfacing with a mouse and cursor function keys are also required. These resources are standard processing components which are also well known in the computer art.

Figure 1:
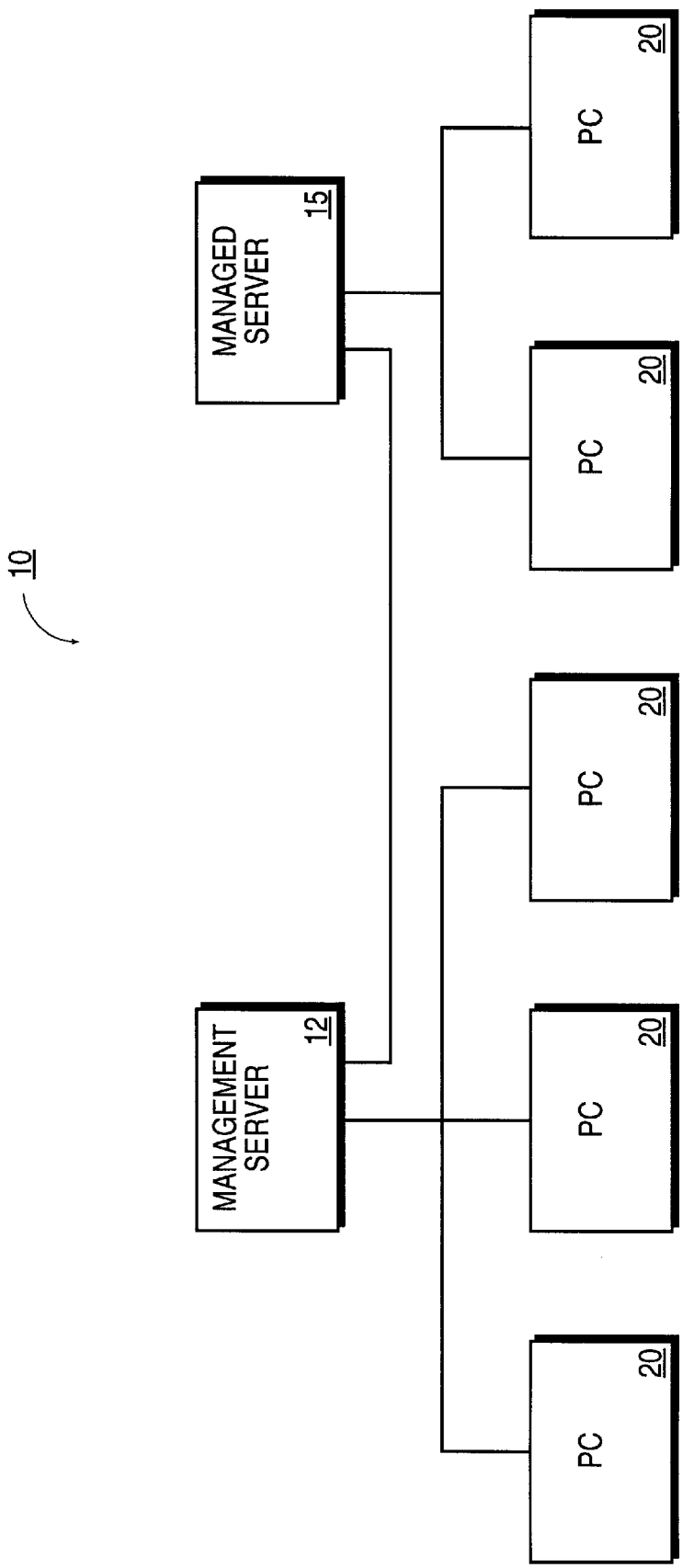
FIG. 1 illustrates a computer network in which the present invention can be implemented.

FIG. 1 illustrates a computer network 10 in which the present invention may be implemented. The network 10 includes a number of individual computer systems 12, 15, and 20. These computer systems include personal computer (PC) systems 20 that are clients of either a management server 12 or a managed server 15. Although many servers may be present in the network 10, only one server, the management server 12, is required in order to implement the present invention. At least some of the services, including control software for coordinating the various services, are implemented within the management server 12. The managed server 15 represents any server in the network 10 other than the management server 12. It should be appreciated that, in any given network in which the present invention is implemented, there may be multiple management servers 12 or managed servers 15.

As will be described in greater detail below, the core services gather data, either periodically or in response to a user command, about the current physical and logical layout of the network. This data, which includes the types of devices in the network, the quantity of each type of device, and their connectivity, is then stored in a database representing a network "map". In addition, the core services gather and maintain data regarding tasks which can be performed upon each of the devices. Tasks are actions that can be taken to troubleshoot, monitor, or report on devices in the network. Some examples of tasks which might be performed on various devices in a network are: viewing the screen of a particular PC; displaying packet counts; running a report; executing a remote virus scan; rebooting selected workstations; displaying print jobs; or, displaying non-functioning printers.

A display, referred to in this description as the "logical view", shows symbolically the devices in the network and associated performable tasks. In one embodiment, the devices are shown as part of a hierarchical structure based on the stored network map. Devices can be organized into various device groups, which are user-definable, and tasks can be organized into various user-definable task categories, which are also user-definable. The user may initiate any of the displayed tasks by applying a user input via a "control panel" screen (e.g., by double-clicking on a task icon with a mouse).

I. User Interface

Figure 2A:
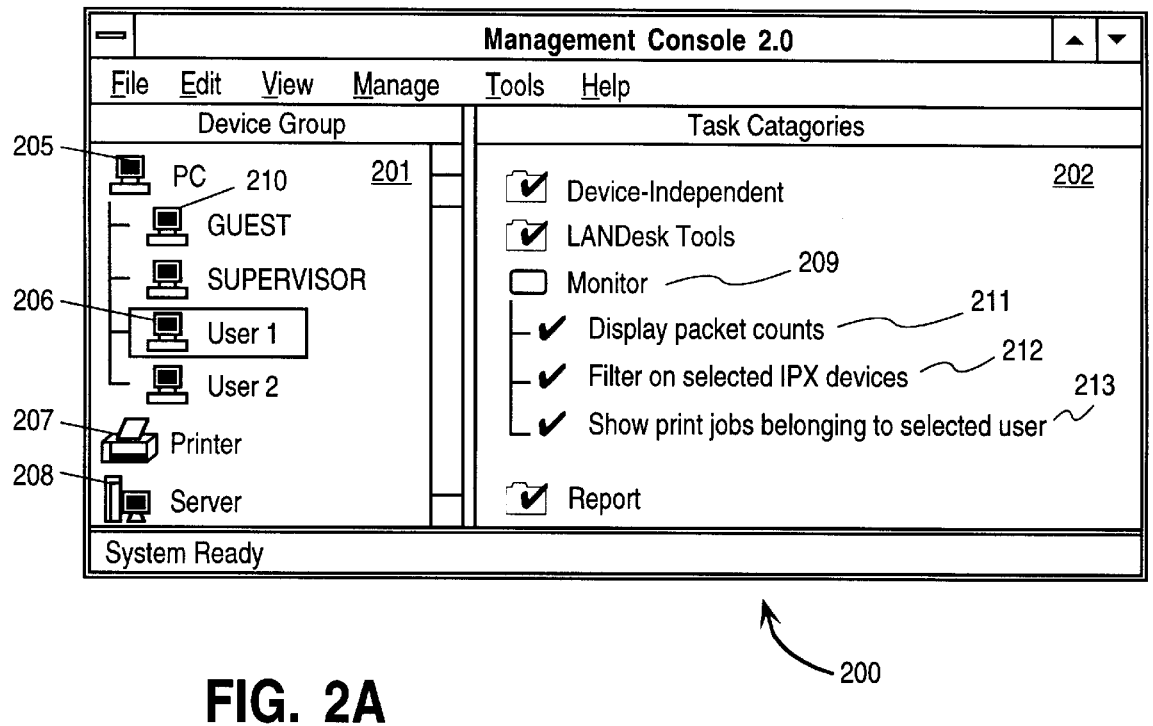
FIG. 2A illustrates a logical view display having a device window and a task window.

FIG. 2A illustrates an example of a logical view 200 display for a typical network. The logical view 200 includes a device window 201 and a task window 202. Devices and device groups in the network are represented in the device window 201. Each group and each device is represented with its name and a bitmap (icon). For example, device window 201 includes bitmaps 205, 207, and 208 representing the "PC" group, the "Printer" device group, and the "Server" device group, respectively. Double-clicking on a group bitmap with a cursor control device (e.g., a mouse, trackball, etc.) will cause that group to be expanded in the device window 201 into a tree hierarchy consisting of all devices within that group. For example, "Guest" 206 and "User 1" 210 are displayed descending from "PC" 205, because those devices are members of the "PC" group.

The task window 202 displays the tasks and categories of tasks that can be performed on a particular device or group which has been selected in the device window 201. For example, the tasks and task categories displayed in task window 202 represent tasks/categories that can be performed upon the device "User 1", the bitmap 206 of which has been selected (and is therefore enclosed by a box) within the device window 201. In the task window 202, tasks 211, 212, and 213 ("Display packet counts", "Filter on selected IPX protocol devices", and "Show print jobs belonging to selected user", respectively) each are members of the task category "Monitor" 209. Selecting a different device or group in the device window 201 will cause a different set of tasks/categories to be displayed corresponding to the selected device or group.

The user can cause any displayed task to be performed upon a device. A task is initiated by the user's selecting the bitmaps of the desired task and the device or group upon which the task is to be performed, and then entering a predetermined user input, such as selecting an option from a pull-down menu, or doubleclicking with the cursor control device on one of the tasks.

Figure 2B:
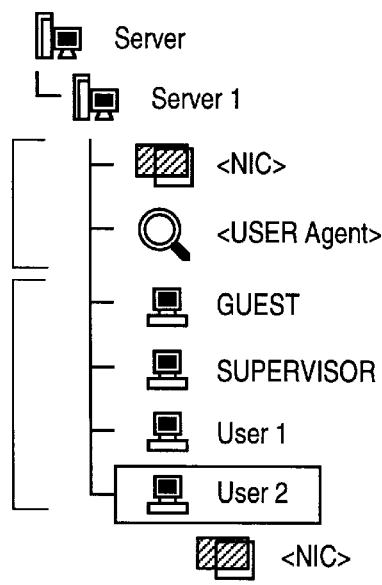
FIG. 2B illustrates a display consisting of a tree hierarchy of devices.

In one embodiment of the present invention, the device window 201 displays a tree hierarchy showing the logical or physical connection of all devices in the network, organized into device groups. FIG. 2B shows an example of a display consisting of a tree hierarchy of devices, as represented by their bitmaps and names. Each of the devices belongs to the group "Server". The group "Server" includes a device "Server 1". Devices "NIC" (Network Interface Card) and "USER Agent" are components of the device "Server 1" and are therefore displayed with their names enclosed by the symbols "< >". Devices "GUEST", "SUPERVISOR", "User 1", and "User 2" are attached to (but not components of) device "Server 1". A second "NIC" is a component of device "User 2". It should be appreciated that alternative embodiments of the present invention might include schematic, geographic, or other views of the layout of the network, in addition to or instead of a tree hierarchy view.

II. System Architecture

As illustrated in FIG. 3, the software of the present invention comprises several core services 300 implemented as distinct modules, which include a discovery manager 301, a database engine 302, a physical network model 303, a view generator 304, and a task manager 305. In general, the discovery manager 301 gathers real-time data about the devices in the managed network 10 and coordinates access to both historical network data and the real-time device data. The database engine 302 provides a logical database structure for storage of network device and task data. The database engine 302 also supports a query mechanism adequate for the needs of various client software applications, such as an inventory management application. Further, the database engine 302 allows client applications to define fields to be stored in a way that is appropriate for each such application. The physical network model 303 includes the actual database and uses the database engine 302 to provide storage and retrieval of network device information for the discovery manager 301. The physical network model 303 represents all known pieces of the managed network 10 and how those pieces interrelate. In some embodiments of the present invention, the physical network model 303 may provide means for client applications to add, modify, and remove devices and the relationships between devices, and provide, in response to a user request, lists of devices with a given relationship to a device or other list of devices. The view generator 304 provides a flexible, user-defined listing of devices in the network 10 and available tasks, which may be displayed in the logical view 200. The LAN Administrator can arrange devices in different ways to provide the most useful presentation of network organization. Finally, the task manager 305 maintains knowledge of all executable tasks in the network and the devices on which such tasks can be performed and initiates tasks in response to user commands.

Figure 10:
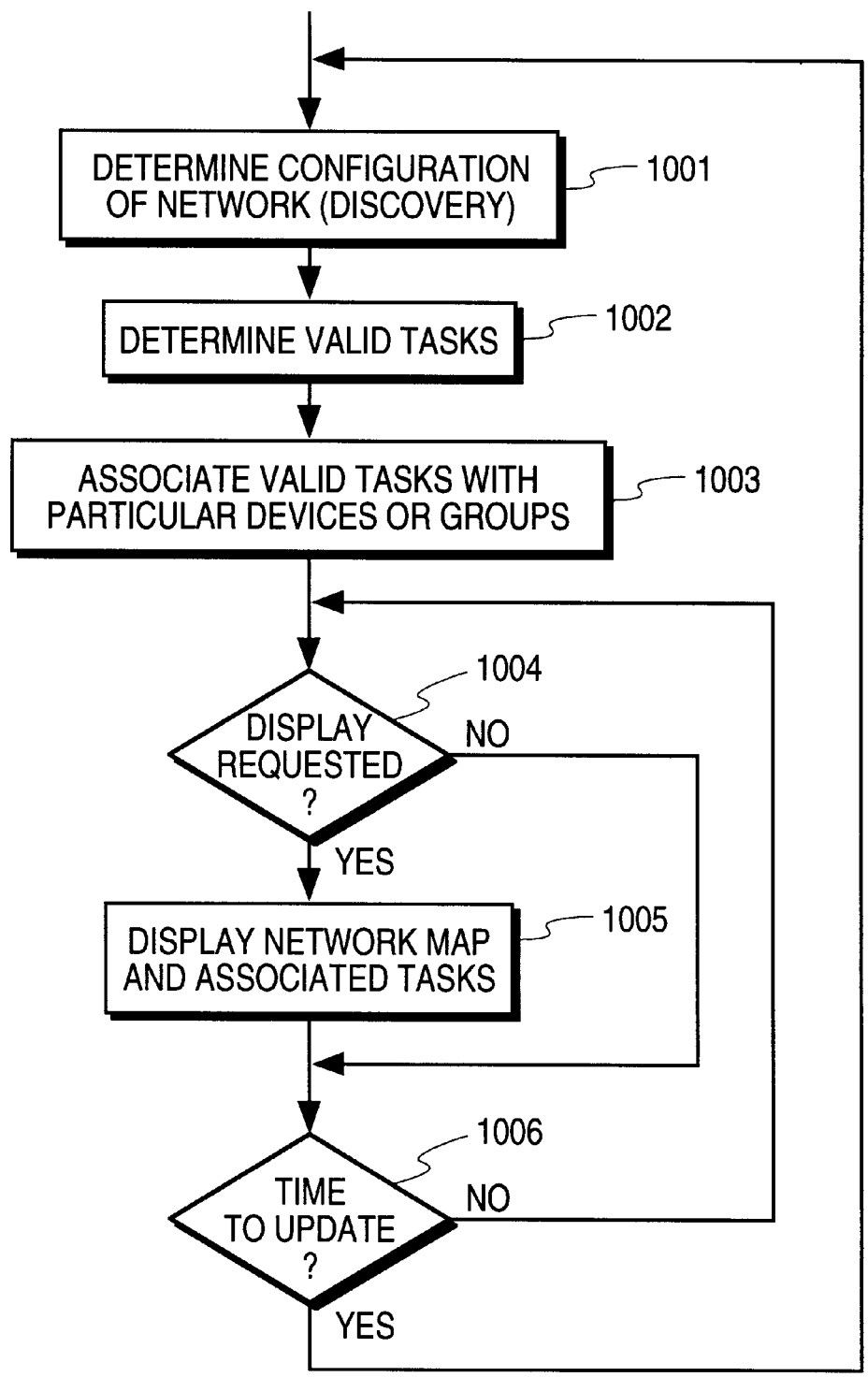
FIG. 10 is a flowchart depicting the overall operation of core services for managing a network in accordance with the present invention.

The overall operation of the core services 300 is illustrated in the flowchart of FIG. 10. The discovery manager 301 determines, either periodically or in response to a user query, the logical (and, optionally, the physical) configuration of the network (step 1001) and stores this configuration information in the database of the physical network model 303. The task manager 305 determines the valid tasks for the network (i.e., tasks that are performable on at least one device in the network) (step 1002) and associates each valid task with the particular devices and groups of devices on which each such task can be performed (step 1003). If a display is requested by the user (step 1004), the logical view 200 is updated and displayed (step 1005) by the view generator 304. The process is then repeated periodically based on a user-defined update frequency (step 1006).

A. Discovery Manager

Figure 4:
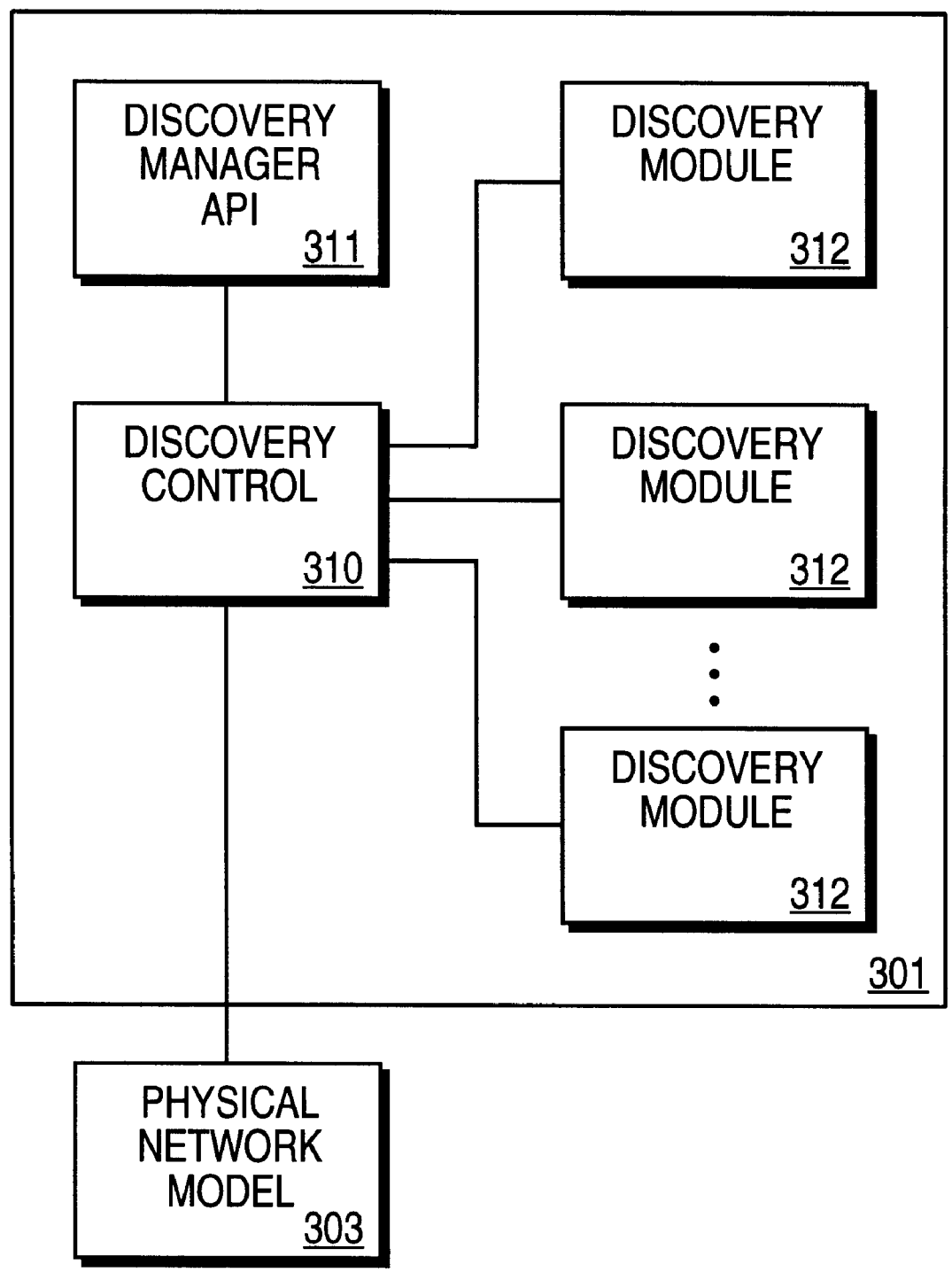
FIG. 4 is a block diagram of a discovery manager core service.

The Discovery Manager provides data on devices that are currently connected in the network as well as historical information about devices that have been connected and available in the past. FIG. 4 shows a block diagram of the discovery manager 301. The discovery manager includes a control module 310, a number of discovery modules 312, and a discovery application programming interface (API) 311. The various discovery modules 312 poll the network 10 to find specific types of devices. Each discovery module is a specialist in finding a certain type of device, although there may be overlap in the particular devices found by different discovery modules. When a device is found by a discovery module 312, that module then adds information about the device to the physical network model 303. Referring again to FIG. 1, the discovery modules 312 may be implemented on the management server 12, or they may be distributed between amongst two or more of the computers on the network 10. The presence of a module for discovering a particular type of device is recorded in a configuration file for use by the discovery control module 310.

The control module 310 and the API 311 are implemented on the management server 12. The control module 310 provides scheduling for the polling of the network performed by the discovery modules 312. The control module 310 also handles user requests for information about devices. The control module 310 can satisfy such requests by searching for devices in the physical network model 303, running one or more discovery modules 312, or both, as needed. The discovery control module 310 determines which discovery module to run by searching for entries in the configuration file that indicate the device type and the name of the corresponding discovery module to run. Thus, the network can be polled automatically by the discovery manager 301 on a periodic basis, where the period can be user-defined, or manually in response to a user's query.

The discovery API 311 provides a functional interface between the operating system of the management server 12 and the control module 310. In the discovery API 311, any functions which return lists of devices or data about a device include a parameter which informs the discovery manager whether to look in the physical model database for the current state of the network, historical data, or both, to supply the list of devices. In either case, the devices identified will be in the database (either the devices were already present or the discovery module placed them there in response to the function being called) and applications can obtain information about them.

Figure 11:
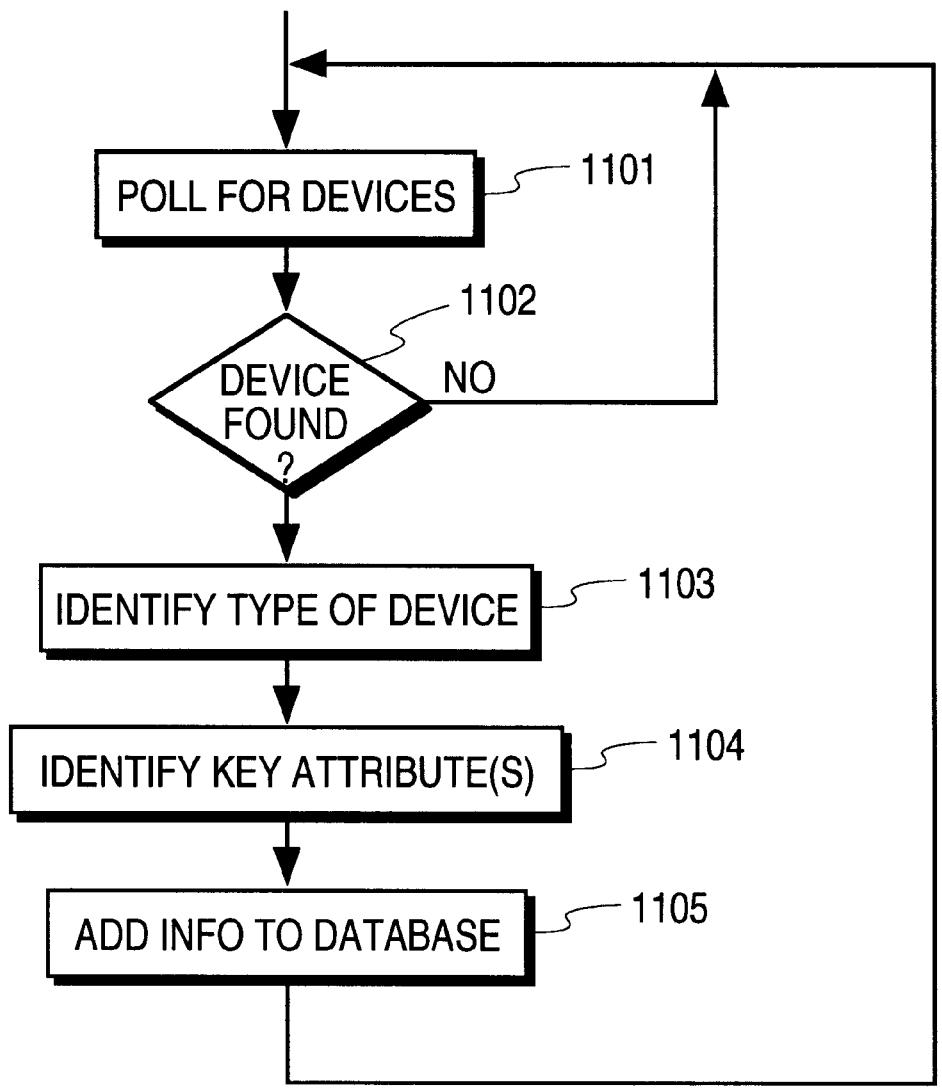
FIG. 11 is a flowchart depicting the steps performed during the network discovery process by core services in accordance with the present invention.

The functions of the discovery API 311 which can retrieve real-time data are:
Get Device Attribute
List Devices
List Device Attributes
List Devices with Attribute
List Devices With Attribute Value
List Linked Devices
List Group Members
The terms "attribute", "attribute value", and the concept of "linked" devices are explained below. Other functions of the discovery API 311 include:
Add Device (to physical network model)
Update Device
Add Device to Group
List Group Members FIG. 11 provides a flowchart of the steps performed in the discovery process. Note that the responsibility for performing these steps may be distributed between various computers in the network Based on the scheduling provided by the control module 310, the individual discovery modules 312 each poll the network for specific types of devices (steps 1101 and 1102). In order to be recognized as part of the network, a given device must provide at least the attributes belonging to a predefined set of attributes for that device type. When a particular device is found, the corresponding discovery module 312 identifies any key attribute values of that device (step 1104) and adds the device and those values to the database (step 1105).

B. Database Engine

As noted above, the database engine 302 supports a query mechanism for use by various client applications. In addition, the database engine allows client applications to define fields to be stored in an appropriate way for each such application. The database will store data efficiently even though the fields of a record are not defined until the core services 300 are actually put into use. Accordingly, the database engine 302 embodies a database schema that is used to define another, more specialized database schema. More specifically, the database engine 302 embodies a metaschema that is used to define the more-specialized schema, which is described below, that is the foundation of the physical network model 303.

Figure 5:
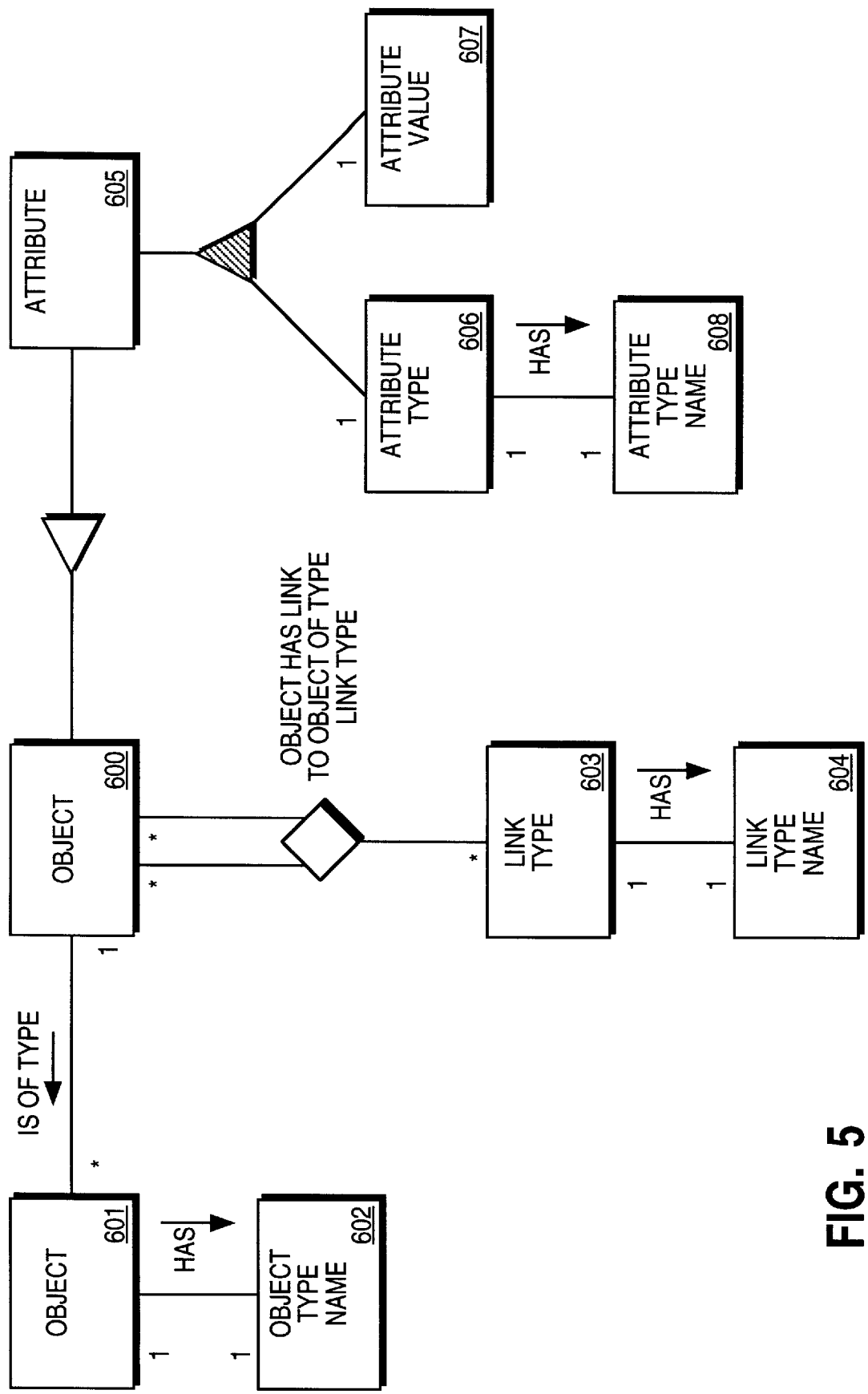
FIG. 5 is an object relationship model (ORM) diagram showing a metaschema of a database engine according to the present invention.

FIG. 5 is an object relationship model (ORM) diagram conceptually showing the components of the database engine's metaschema and their relationships to each other. The primary storage unit of the database is an object 600. In the ORM diagram in FIG. 5, rectangles represent object classes, lines represent relationships between objects, a diamond indicates a ternary relationship, an unfilled triangle represents the concept of specialization, and a filled triangle represents the concept of aggregation. An object 600 has an object type 601 associated with it, which is registered by the user. Each object type 602 has an object type name 602. An object 600 also has a link 603 of a specific link type 603 to another object 600. Link types 603 are registered by the user and may represent any logical connection or relationship the user wishes. Two objects 600 may have multiple links, but each link must be of a different link type 603. Each link type 603 has a link type name 603. Examples of some possible link types are: IPX (i.e., a communication protocol), physical component, logical component, and ethernet. Link records may be stored in a separate table from the object records for improved efficiency.

Attributes 605 are used for attaching data selected by the user (e.g., an device address, a mail center, etc.) to objects 600. Attributes 605 are optional fields, in that they can be used for only selected devices. Attributes 605 are also the criteria which are used in determining if a device is recognized by the discovery manager 301 as part of the network, as will be described below. In order to be recognized as part of the network, a given device must provide at least the attributes that have been previously defined for a given device type. An attribute 605 is a specialization of an object 600. In addition, an attribute 605 is an aggregation of an attribute type 606, which is registered by the user, and an attribute value 607. Objects 600 are therefore linked to attributes 605. Each attribute type 606 has an attribute type name 608.

C. Physical Network Model

Figure 6:
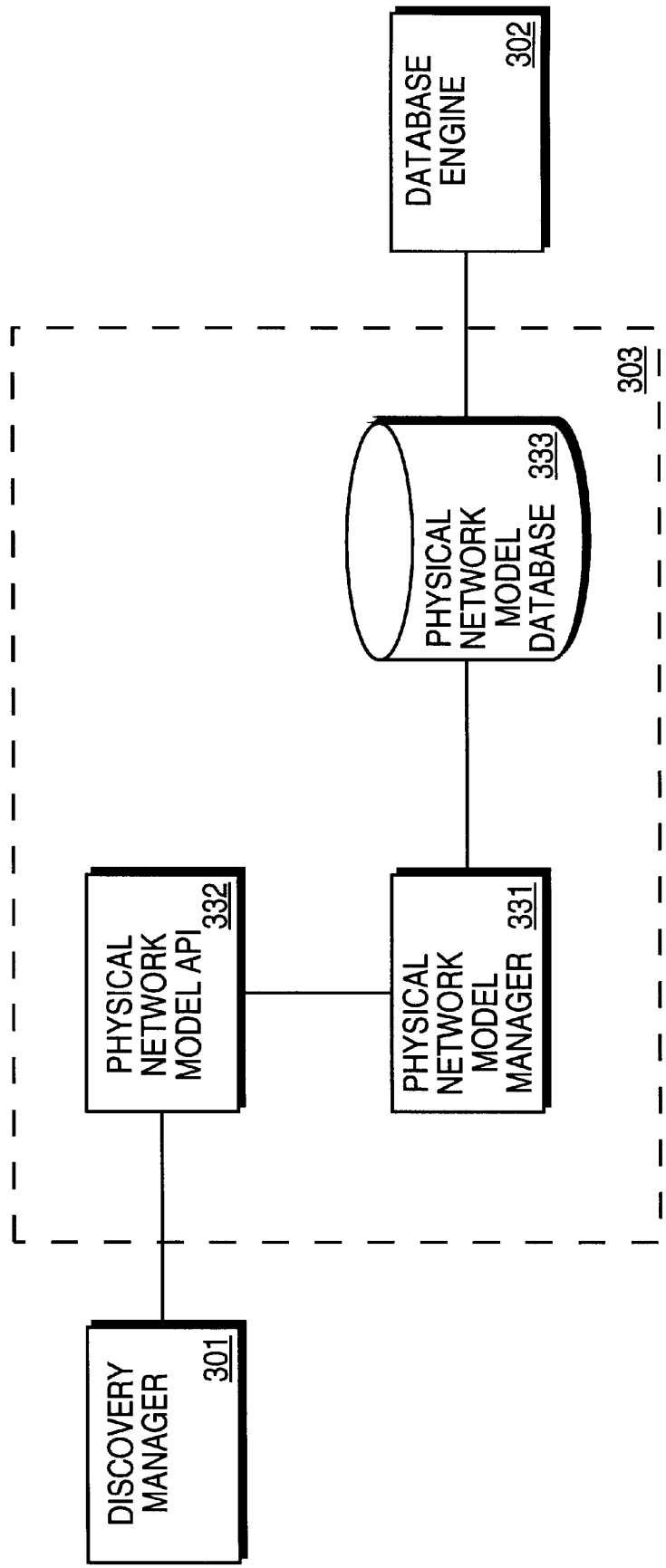
FIG. 6 is a block diagram of a physical network model core service.

The physical network model (PNM) 303 represents all known pieces of the managed network 10 and how those pieces interrelate. Referring to FIG. 6, the PNM 303 includes a PNM Manager 331, a PNM API 332 functionally coupled to the discovery manager 301, and a physical model database 333 driven by the database engine 302. The PNM 303 provides storage in the physical model database 333 of the real-time and historical network information acquired by the discovery modules 312. The stored information includes the devices, device types, device attributes, and relationships between devices in the network. Devices are represented in the physical model database 333 as objects (see FIG. 4) and relationships are represented as links. The PNM 303 further provides means for client applications to add, modify, and remove devices and relationships between devices. The PNM 303 further provides, in response to user requests, lists of devices with a specified relationship to a device or other list of devices.

To represent the physical organization of a network, the PNM 303 uses a list of all devices which have been discovered by the Discovery Manager 301 and maintains within the physical model database 333 information on how each device is connected to each other device. This connectivity information may include such information as the fact that a device is physically installed in the same box as another device, a client/server relationship, or any other connection type that could be useful to an application. The complete physical model database 333 represents a graph (i.e., a numerical model) in which the nodes in the graph represent devices and the connection between the nodes represents the connections between the devices. Standard graph theory may be used to find various relationships between nodes, such as the shortest path, cycles, connectivity, and optimization.

Figure 8:
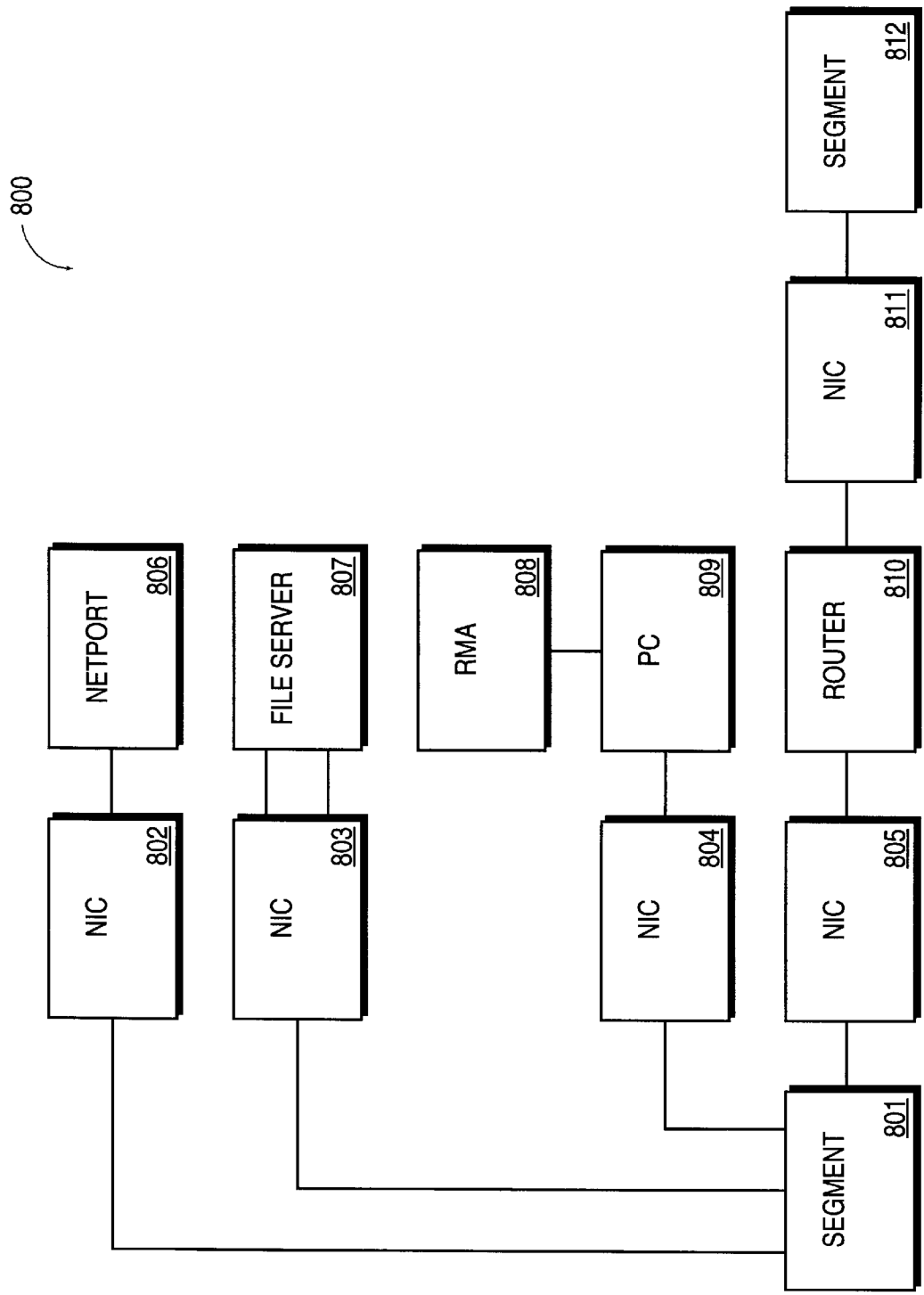
FIG. 8 illustrates a graph representing network configuration information stored in accordance with the present invention.

FIG. 8 illustrates how a typical network might be stored and the various connections determined in the PNM database 333 using this approach. The network of FIG. 8 includes a segment 801 and a segment 812. A segment generally represents any physically or logically contiguous part of a network. Devices which are shown (and therefore stored) as linked to a particular segment reside on that segment. In FIG. 8, therefore, NIC's 802, 803, 804, and 805, NetPort 806, File Server 807, Remote Management Agent (RMA) 808, and PC 809 all reside on segment 801. Devices which reside on different segments must be coupled by a router to communicate with each other. NIC 811 belongs to segment 812; therefore, router 810 is coupled between NIC 801 and NIC 811 in order for devices on segment 801 to communicate with devices on segment 812.

During the discovery process, device interconnections may be determined by examination of device attributes. For example, in one embodiment devices may have their segment numbers and other connection information encoded into their network addresses (which are attributes). There may be more than one connection between two nodes. In FIG. 8, for example, the File Server 807 is connected to NIC 803 two times; such a connection might appear when a server is running more than one protocol stack (e.g., IPX and either TCP/IP or AppleTalk). Also, by the property of transitivity, if there is a path between two nodes, those nodes are connected and the intervening nodes can be ignored by an application, if appropriate.

Referring again to FIG. 6, the PNM Manager 331 is essentially a front-end for the database. The PNM Manager 331 is responsible for properly maintaining all links and performing the queries requested of it and ensures that new nodes are inserted properly into the graph. The PNM Manager 331 can use the transitivity of the database to build lists of connected objects (e.g., which computers are connected to a particular segment).

Figure 7:
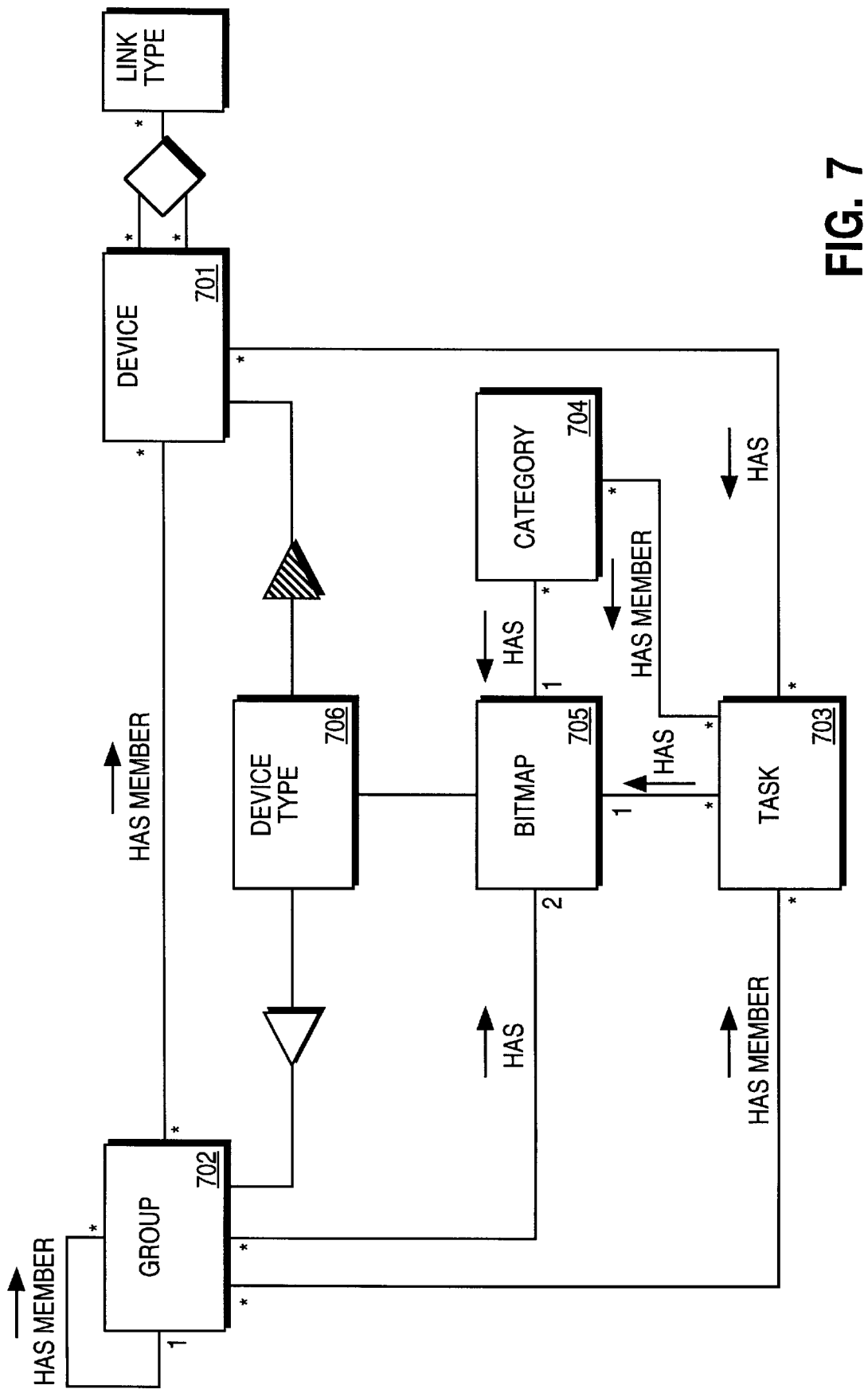
FIG. 7 is an object relationship model (ORM) diagram of a physical network model schema.

As mentioned above, the physical network database 333 is characterized by a schema. FIG. 7 is an ORM diagram conceptually illustrating the PNM schema. The PNM schema is based on the metaschema described above with reference to FIG. 5. The schema includes several object types for defining records in the physical model database 333. Referring to FIG. 7, the object types include: device 701, group 702, task 703, category 704, and bitmap 705. The device object type 601 is used to represent the devices in the network, and the group object type 702 is for representing groups of devices. The task object type 703 is for representing the tasks which may be performed, and the category object type 704 is for representing categories of tasks. The bitmap object type 705 is for representing displayable bitmaps of devices, groups, tasks, and categories.

As illustrated by FIG. 7, various device types 706 can be defined by the user. Each device type 706 can have multiple devices 701 associated with it; however, each device 701 can be of only one device type 706. Each device 701 can have one or more tasks 703 associated with it, and a task may be performable upon (or by) more than one device. If a device has a task, then that task is performable taking the device as a parameter. Each group 702 can have both devices 701 and tasks 703 as members. If a task is a member of a particular group, then that task may take as a parameter any device which is a member of that group. A group 702 can be a specialization of a device type 706 (i.e., a group can represent a particular type of device). A device 701 can be a member of more than one group 702. Groups 702 can be defined by the user based on arbitrary criteria and can be overlapping. Each category 704 has at least one task 703 as a member. As with groups, categories 704 can also be defined by the user and can be arbitrary. Devices are represented by two bitmaps 705, an active bitmap to indicate that the device is on-line, and an inactive bitmap to indicate that the device is off-line. Each task 703 and each category 704 is also represented by a bitmap 705.

D. View Generator

The view generator 304 provides a user-definable listing of devices in the network 10 and available tasks, which may be displayed in the device window 201 and the task window 202 (see FIG. 2A). The LAN Administrator can arrange devices in different ways to provide the most useful presentation of network organization. In particular, the user interface provide capability for "drag-and-drop" maintenance of groups, group membership, and devices. A facility to expand and collapse portions of the device tree is also provided. The view generator 304 also provides capability to: show both historical or real-time information about the devices on the network; show group membership; filter the devices and groups to select only certain devices or groups for display; and, expand and collapse the displayed portions of the tree structure of devices/groups or tasks/categories.

Figure 9:
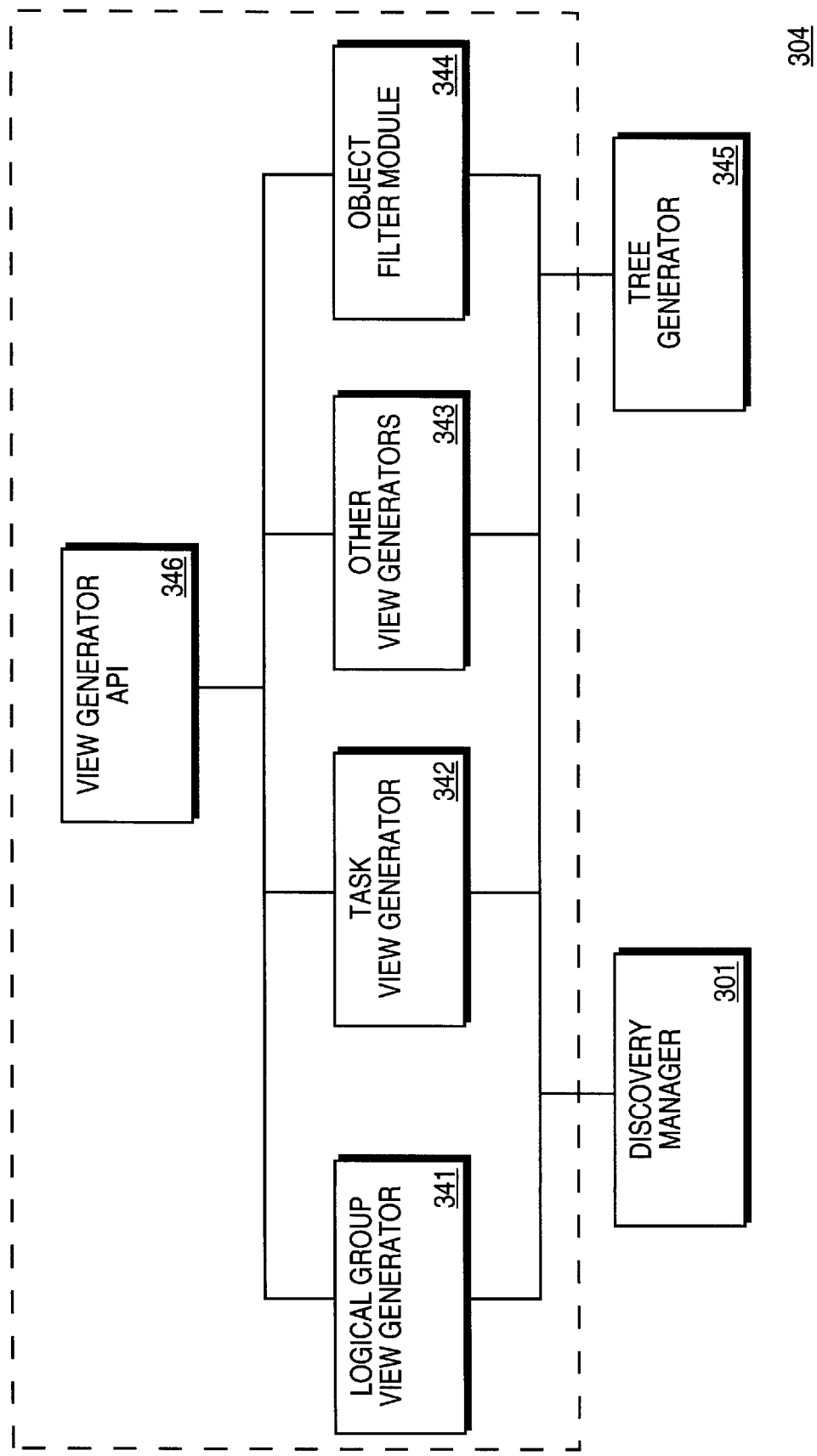
FIG. 9 is a block diagram of a view generator core service.

In one embodiment of the present invention, illustrated in FIG. 9, the view generator 304 provides for two views to be displayed in tree-hierarchy form, a logical group view and a task view. In this embodiment, the view generator 304 includes a logical group view generator 341, a task view generator 342, an object filter module 344, and a view generator API 346 driving the group view generator 341, and the task view generator 342. The view generator 304 includes API functions related to the generation of tree views and is logically coupled to a tree generator 345. Various other view generators 343 may also be included for generating different types of displays.

The view generator API 346 allows a client application to request that a logical view be displayed, and which type of view is to be displayed. Means is also provided for the maintenance of groups, group membership, and devices. The client application is notified of changes in the selection state, and can query the current selection state. The client application can search for a device in the list by name, group membership, or both. The search can be repeated to find multiple occurrences of a device in the tree. Client applications can also specify a filter to select only certain devices or groups be displayed.

The logical group view generator 341 populates the tree-structure for display in the device window 201 of the logical view 200. A logical group is simply a collection of devices. The logical group view generator 341 fills an outline for display within the device window 201 with a list of devices grouped according to their group memberships. The group view generator 341 obtains group definitions from the physical model database 333, while device information is obtained from the discovery manager 301. This information may be real time, historical, or both, depending on the type of display requested by the client. The devices and groups are then filtered according to user-provided criteria, leaving only those devices and groups requested.

The remaining information is then placed in the outline for display. The tree generator 345 generates the graphics functions required to display the outline in the form of a tree hierarchy. Various methods and products are known in the art for performing the function of the tree generator 345.

In the device window 201, a top level of the tree-structure will contain a line for each defined group. Expanding a line (e.g., by double-clicking with the mouse) will reveal, at the next level, the individual members of the group. Note that a device may belong to more than one group. Two classes of logical groups are provided for: 1) device types, 2) and user-created groups. Device types are predefined logical groups that correspond to physical device types. The discovery modules 312 can automatically create these groups and assign group membership. User-created groups are created by the LAN administrator who assigns group membership.

The Task View Generator 342 populates the tree-structure for display in the task window 202 of the logical view 200. In the preferred embodiment, all tasks that can be performed on a selected device in the device window 201 are displayed in the task window 202. The top level of the outline contains the task categories of a selected device or group. Expanding a category will reveal, at the next level, the actual tasks that are available. Users may create task categories and tasks within any predefined or user-defined category. In one embodiment, if the current selection is a device, the displayed available tasks are both those tasks that are directly assigned to the selected device and all tasks that are assigned to all groups of which the device is a member. If the current selection is a group, the displayed available tasks are those tasks that are assigned directly to the selected group. Further, if multiple items are selected, the displayed available tasks are the intersection of all tasks that are assigned directly to all selected devices, all tasks that are assigned directly to all selected groups, and all tasks that are assigned to all groups of which the selected devices are members. As with the group views, the tree generator 345 generates the graphics functions required to display the tasks and categories in the form of a tree hierarchy.

The other view generators 343 may be included to generate other alternative views of the network. Alternative views might include a schematic display of segments, such as that shown in FIG. 8, or a geographic layout of network components. A geographic view, for example; may be implemented by combining discovered device information with grid coordinates corresponding to a floor plan of a particular building or complex.

The Object Filter Module 344 is used to reduce the logical view data down to only that information which the client application wishes to display, as mentioned above. For each group and device displayed, that device will be compared to the criteria of the filter and displayed only if there is a match.

The core services 300 also include a logical view database which provides storage and retrieval of information about groups, such as group names, the bitmap to be displayed when a given group is displayed, and members of the group. In the preferred embodiment, the logical view database is included in the physical model database 333 for data consistency.

E. Task Manager

The task manager 305 performs two main functions: 1) maintaining knowledge of all executable tasks in the network and the devices upon which such tasks can be operated, and 2) initiating tasks in response to user commands entered via the control panel. A task consists essentially of an atomic script and any associated parameters. A parameter associated with a task may be a device upon which a task will be performed. Tasks include functions for troubleshooting, monitoring, and reporting on devices.

In determining the executable tasks in the network and the devices on which such tasks can be performed, the task manager 305 makes use of the PNM schema described with reference to FIG. 7. Recall that each device can have one or more tasks associated with it; that if a device has a task, then that task is performable taking that device as a parameter; that each group can have both devices and tasks as members; and, that if a task is a member of a particular group, then that task may take as a parameter any device which is a member of the same group. Thus, tasks are linked to devices and groups of devices. The task manager 305 examines these links to determine the available tasks for particular devices and groups. In the preferred embodiment, available tasks are stored in the physical model database 333.

As will be discussed below, the task manager 305 can provide a display, in response to a user's selection of one or more devices or groups, showing the effective tasks associated with the selected devices or groups. A user may initiate a task by, for example, selecting a device or group and then double-clicking on an available (displayed) task. Tasks may also be defined by the user, and individual tasks may be combined by the user to form compound tasks.

Figure 12:
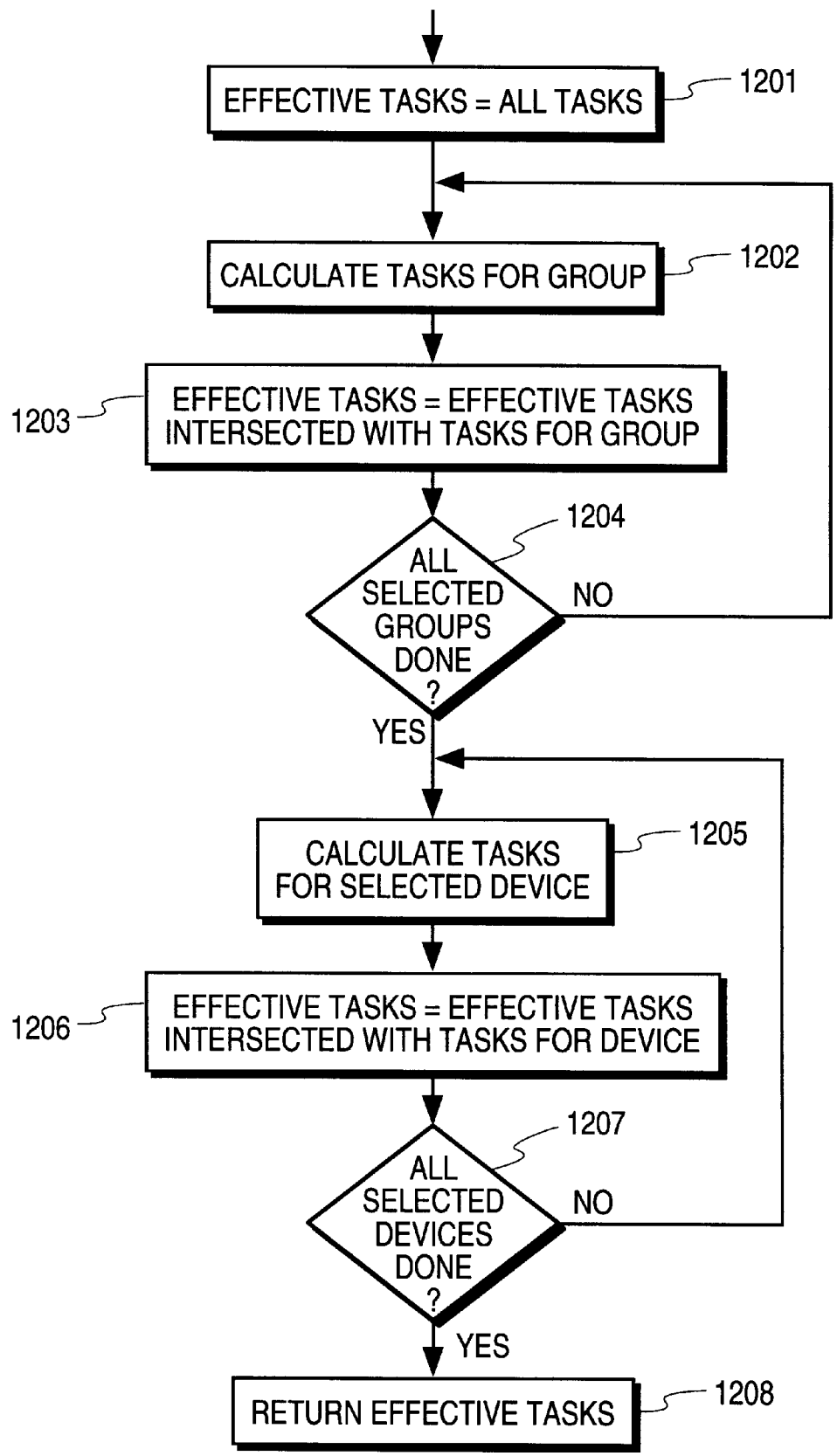
FIG. 12 is a flowchart illustrating the steps for calculating the tasks for a selected device or group.

The function of maintaining knowledge of all executable tasks in the network can be broken down into four sub-functions: 1) calculating tasks for a device or group which has been selected via a user input; 2) calculating tasks for a group; 3) calculating tasks for a device; and, 4) calculating tasks of a component (device). With regard to the first sub-function, a user input selecting one or more devices or groups will cause the Task Manager 305 to invoke an API call to the link in the physical model database 333 that associates the selected devices or groups with their effective tasks. FIG. 12 illustrates the steps for calculating the tasks for a selection (device or group). The value Effective Tasks, which is initially null (step 1201), represents all effective tasks for the selected device or group. For each group that is selected (step 1204), the effective tasks for the group, Tasks for Group, is calculated (step 1202), and Effective Tasks is then updated to be the intersection of Effective Tasks with Tasks for Group (step 1203). Next, for each device that is selected (step 1207), the effective tasks for the device, Tasks for Device, is calculated (step 1205), and Effective Tasks is updated to be the intersection of Effective Tasks with Tasks for Device (step 1206). The value Effective Tasks is then returned (step 1208).

Figure 13:
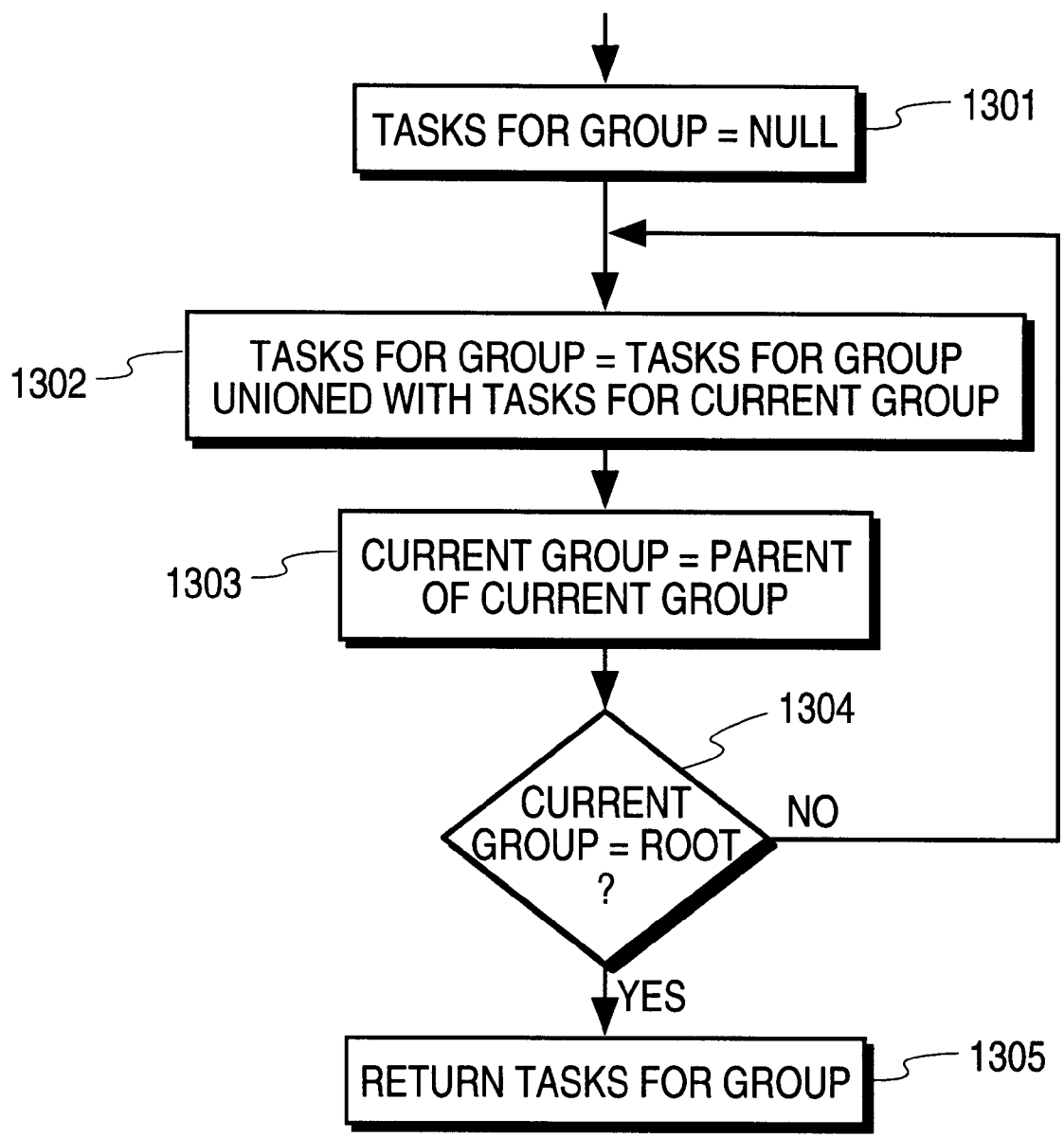
FIG. 13 is a flowchart illustrating the steps for calculating tasks for a group.

FIG. 13 illustrates the steps for calculating tasks for a group. The value Tasks for Group, which is initially null (step 1301), represents all effective tasks for a given group. Tasks for Group is unioned with the effective tasks (Tasks for Group) for a "current group" to generate a new value of Tasks for Group (step 1302). Next, the current group is updated to be the parent of the current group (step 1303), and the previous step (step 1302) is repeated until the current group is the root (top level of the tree) (step 1304). The value Tasks for Group is then returned (step 1305).

Figure 14:
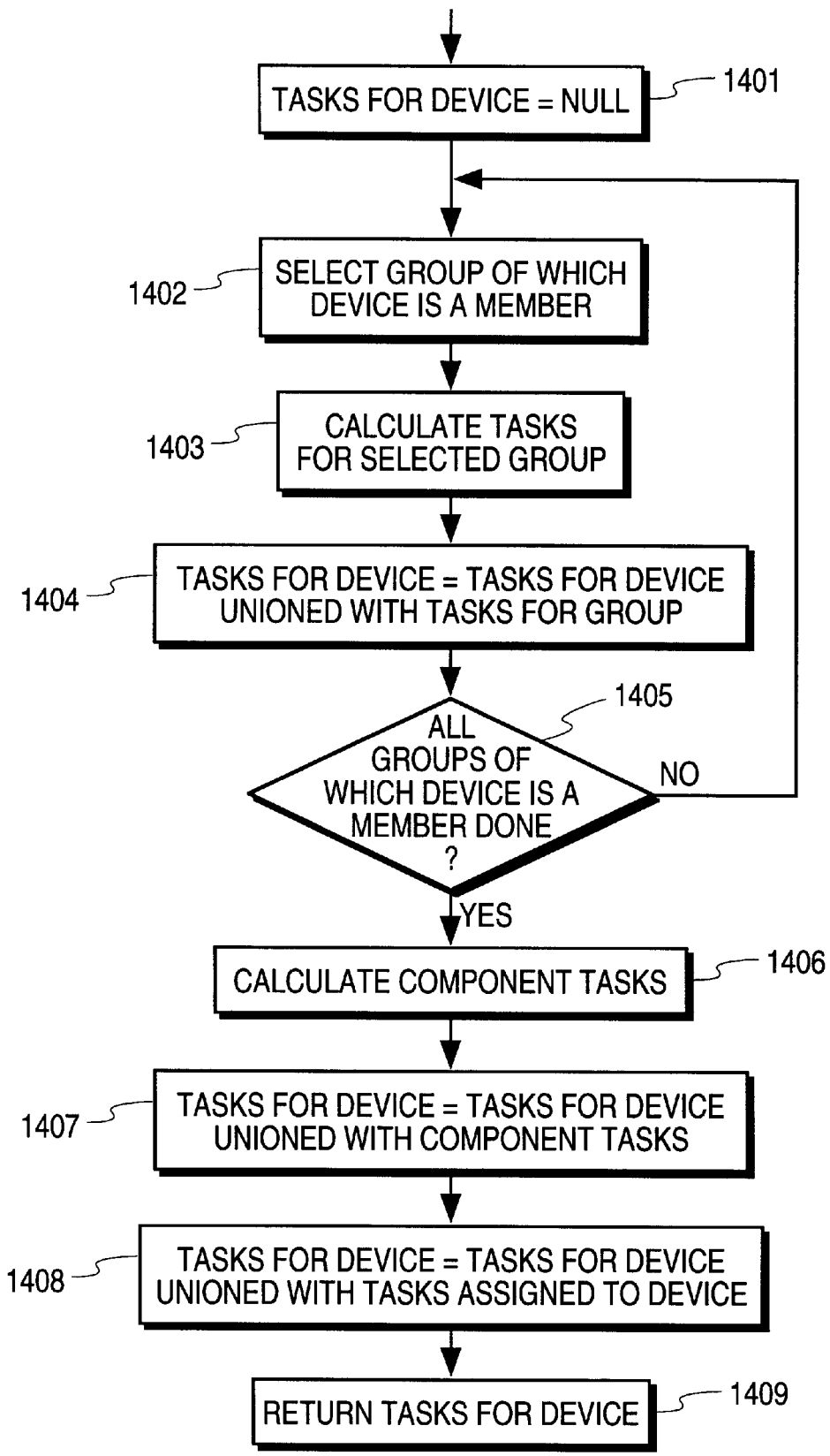
FIG. 14 is a flowchart illustrating the steps for calculating the tasks for a given device.

FIG. 14 illustrates the steps for calculating the tasks for a given device. The value Tasks for Device, which is initially null (step 1401), represents all effective tasks for a given device. For each group of which the device is a member (steps 1402, 1405), the effective tasks for that group, Tasks for Group, is calculated (step 1403), and then Tasks for Device is updated to be Tasks for Device unioned with Tasks for Group (step 1404). Next, the effective tasks for all components of the selected device, Component Tasks, is calculated (step 1406). Tasks for Device is then updated to be Tasks for Device unioned with Component Tasks (step 1407). Next, Tasks for Device is updated to be Tasks for Device unioned with all tasks which are assigned to the given device (step 1408). Finally, the value Tasks for Device is returned (step 1409).

Figure 15:
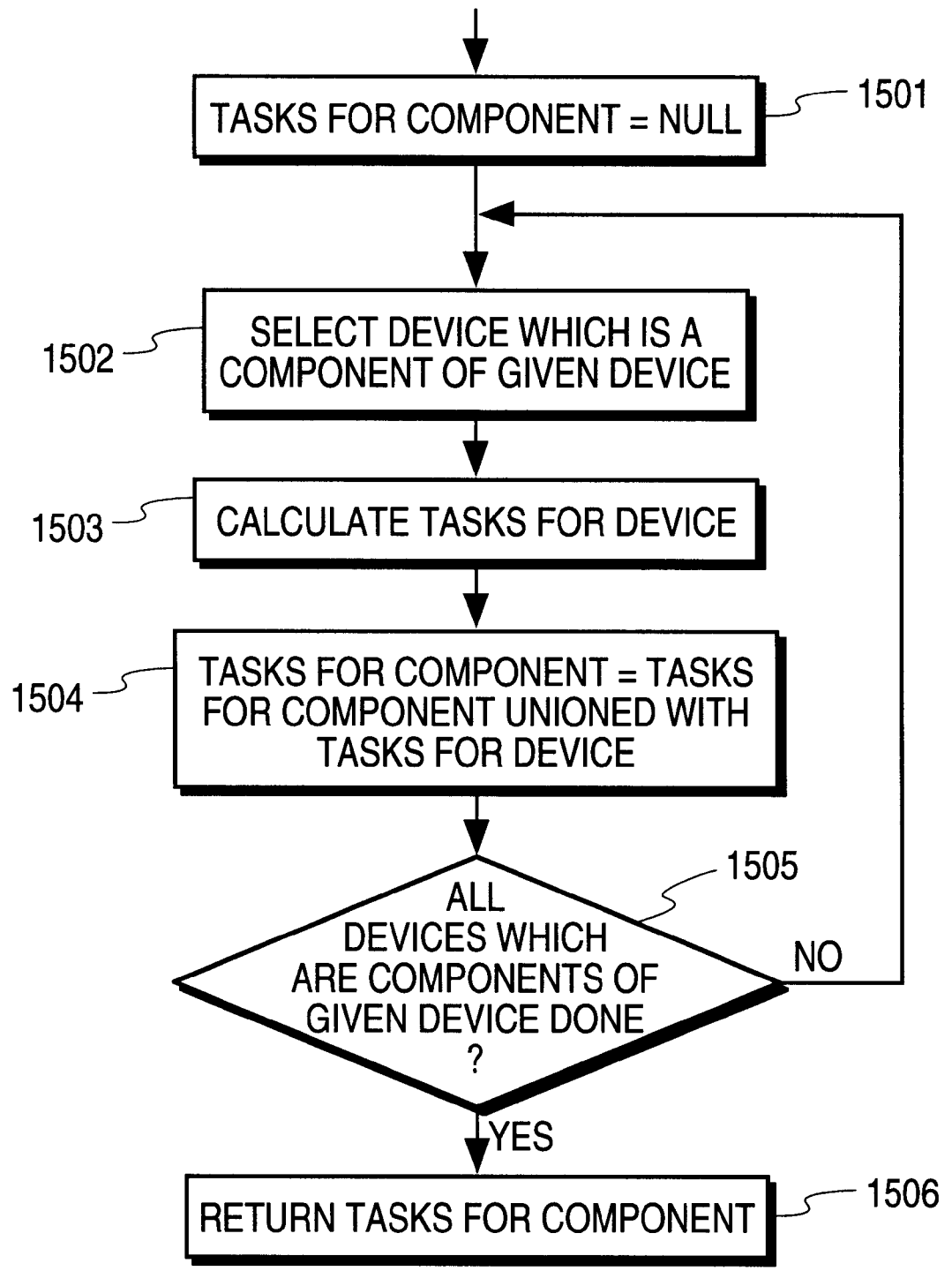
FIG. 15 is a flowchart illustrating the steps for calculating tasks of a component.

FIG. 15 illustrates the steps for calculating Component Tasks. The value Tasks for Component, which is initially null (step 1501), represents all effective tasks for a component of a given device. For each device which is a component of a given device (steps 1502,1505), Tasks for Device is calculated (step 1503), and Tasks for Component is updated to be Tasks for Component unioned with Tasks for Device (step 1504). The value Tasks for Component is then returned (step 1506).

Thus, a method and apparatus for providing management services for a computer network has been described. The management services are designed from a flexible, device-oriented perspective in order to provide the user with information on the layout of the network, tasks that can be performed, and the devices on which each particular task can be performed. The services further provide the user with customizable ways of viewing the layout of the network.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A machine-readable program storage medium tangibly embodying sequences of instructions, the sequences of instructions for execution by at least one processing system to perform steps for defining a schema for a database, the database for storing a physical model of a computer network, the computer network including a plurality of devices, said steps comprising:

defining a device object type for representing the devices;

defining a task object type for representing a plurality of tasks, each of the tasks performable on at least one of the devices; and defining a group object type for representing a plurality of groups, such that each of the groups may have at least one of the devices as a member, such that each of the groups may have at least one of the tasks as a member, and such that any of tasks which is a member of one of the groups is performable on each device that is a member of said group.

2. A machine-readable program storage medium according to claim 1, wherein the device object type, the task object type, and the group object type are for characterizing a plurality of objects, each of the objects representing a record of the database.

3. A machine-readable program storage medium according to claim 1, the steps further comprising:

defining a category object type for representing a plurality of categories, such that each of the categories may have at least one of the tasks as a member; and defining a bitmap object type for representing a plurality of bitmaps, such that each of the groups is represented by at least one of the bitmaps, such that each of the tasks is represented by one of the bitmaps, and such that each of the categories is represented by one of the bitmaps.

4. A machine-readable program storage medium according to claim 1, said steps further comprising defining a plurality of device types, each of the devices being of one of the device types, each of the device types representing at least one of the devices, wherein one of the groups can be defined to represent one of the device types.

* * * * *